United States Patent
Ormson et al.

(10) Patent No.: US 7,313,397 B2
(45) Date of Patent: Dec. 25, 2007

(54) CELLULAR NETWORK ACQUISITION METHOD AND APPARATUS

(75) Inventors: Richard Ormson, Berkshire (GB); Frederic Gabin, Berkshire (GB); Darioush Downer, Berkshire (GB); Nigel Legg, Berkshire (GB); Osamu Yamashita, Berkshire (GB)

(73) Assignee: NEC Corporation, Tokyo (JP)

( * ) Notice: Subject to any disclaimer, the term of this patent is extended or adjusted under 35 U.S.C. 154(b) by 149 days.

(21) Appl. No.: 10/714,892

(22) Filed: Nov. 18, 2003

(65) Prior Publication Data

US 2005/0003817 A1 Jan. 6, 2005

(30) Foreign Application Priority Data

Nov. 19, 2002 (GB) .................................. 0226978.5

(51) Int. Cl.
*H04Q 7/20* (2006.01)

(52) U.S. Cl. ................. 455/435.2; 455/435.1; 455/435.3; 455/552.1; 455/553.1; 455/115.1; 455/115.3; 455/434; 370/342

(58) Field of Classification Search .. 455/435.1–435.3, 455/552.1, 553.1, 115.1, 115.3, 434; 370/342
See application file for complete search history.

(56) References Cited

U.S. PATENT DOCUMENTS

| | | | | |
|---|---|---|---|---|
| 4,670,899 A * | 6/1987 | Brody et al. | ................. | 455/453 |
| 5,574,973 A | 11/1996 | Borth et al. | ............. | 455/435.2 |
| 5,754,542 A * | 5/1998 | Ault et al. | ................... | 370/342 |
| 5,953,665 A | 9/1999 | Mattila | ........................ | 455/434 |
| 5,960,354 A * | 9/1999 | Einola | ........................ | 455/454 |
| 5,995,829 A * | 11/1999 | Broderick | .................... | 455/418 |
| 6,119,003 A * | 9/2000 | Kukkohovi | ............... | 455/435.2 |
| 6,169,733 B1 * | 1/2001 | Lee | ............................. | 370/342 |
| 6,185,435 B1 * | 2/2001 | Imura | ...................... | 455/552.1 |
| 6,212,384 B1 * | 4/2001 | Almgren et al. | ............ | 455/446 |
| 6,223,037 B1 | 4/2001 | Parkkila | ..................... | 455/434 |
| 6,466,802 B1 * | 10/2002 | Blakeney et al. | ........ | 455/552.1 |
| 6,477,372 B1 * | 11/2002 | Otting et al. | ............... | 455/434 |
| 6,748,246 B1 * | 6/2004 | Khullar | ...................... | 455/574 |
| 6,766,169 B2 * | 7/2004 | Cooper | .................... | 455/435.2 |
| 6,978,138 B2 * | 12/2005 | Japenga et al. | ............. | 455/436 |
| 2003/0190916 A1 * | 10/2003 | Celedon et al. | ............. | 455/437 |
| 2004/0043798 A1 * | 3/2004 | Amerga et al. | ............. | 455/574 |
| 2004/0116110 A1 * | 6/2004 | Amerga et al. | .......... | 455/422.1 |

FOREIGN PATENT DOCUMENTS

WO WO 00/27158 5/2000

OTHER PUBLICATIONS

European Search Report dated Feb. 24, 2004.

* cited by examiner

*Primary Examiner*—William Trost
*Assistant Examiner*—Ariel Balaoing
(74) *Attorney, Agent, or Firm*—McGinn IP Law Group, PLLC

(57) ABSTRACT

A method of network acquisition for a cellular radio communications device arranged for operation in accordance with a plurality of radio technologies and comprising searching to identify a suitable cell on one radio technology. Subsequent to identifying a suitable cell on the one radio technology, cells on another of the plurality of radio technologies are also monitored in order to identify if one of the monitored cells is more suitable than the cell identified on the one radio technology. Subsequent to the monitoring, the cell identified from all of the radio technologies searched as the most suitable is selected and camping for the first time occurs onto that cell.

15 Claims, 2 Drawing Sheets

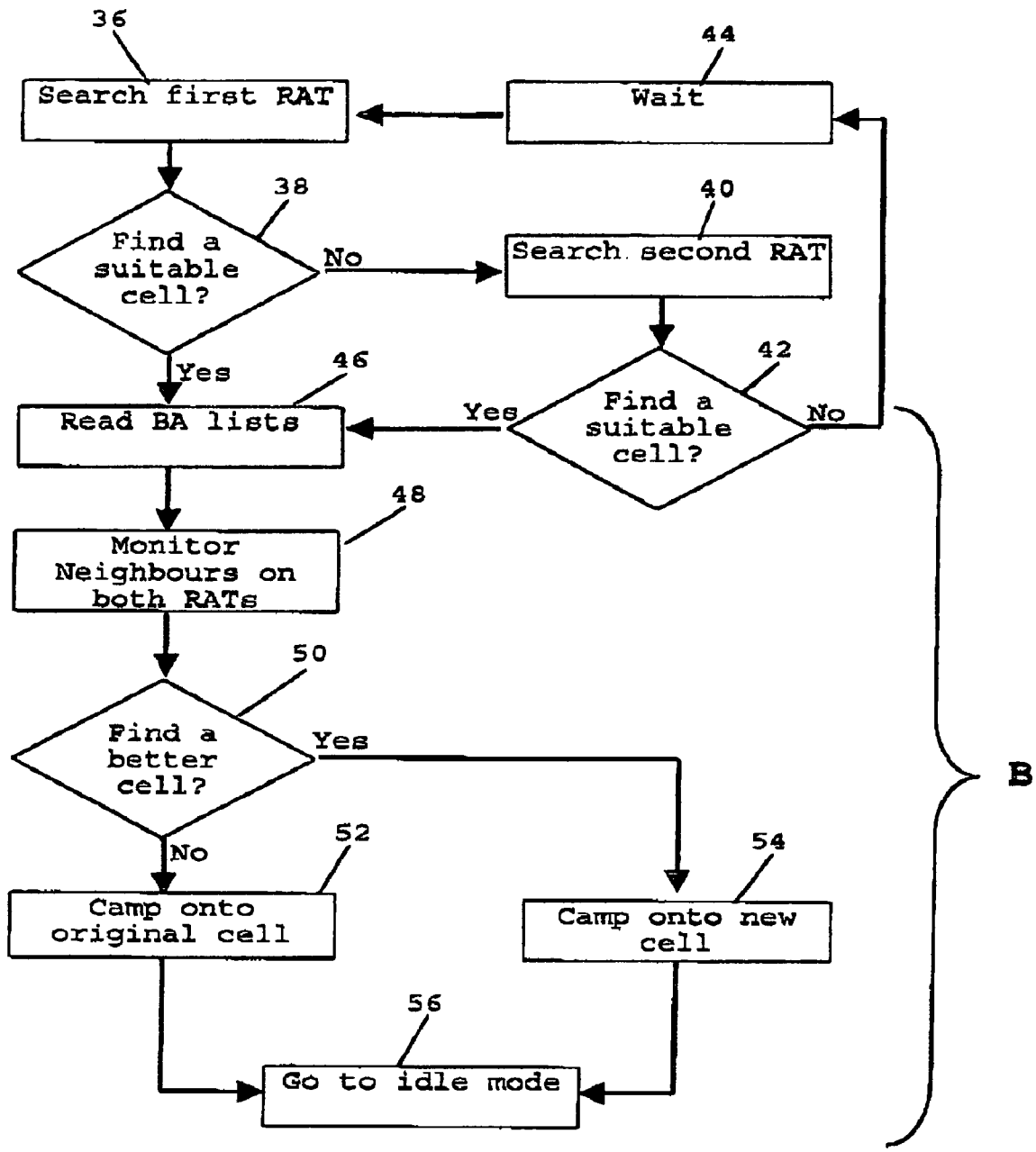

CELLULAR NETWORK ACQUISITION METHOD AND APPARATUS

BACKGROUND OF THE INVENTION

1. Field of the Invention

The present invention relates to a method and apparatus for use in network acquisition for cellular communications devices.

2. Description of the Related Art

Cellular communications devices such as cell phones, have become increasingly popular and widely adopted and in many instances have become the prime means of communication both for business and domestic requirements.

As such usage becomes more widespread, potentially disadvantageous and limiting features of such devices become more apparent. For example, when a cell phone is first turned on, an acquisition procedure needs to be conducted so that the cell phone can acquire the appropriate communications method and subsequently take part in a communications exchange over that network. The period between turning the cell phone on and actually acquiring the network does not generally go unnoticed by the user and comprises dead time as far as the user is concerned since no other operations over and above network acquisition are conducted during that period. The longer the time period required to acquire the network, the more likely this period is to be noticed by the user and so as to lead to potential irritation.

Also, network acquisition procedures require the cell phone handset to expend a significant amount of power relative to power requirements arising merely for communication procedures.

Indeed, in view of the different mobile communication modes that have arisen, and the subsequent requirement for cell phone handsets to offer dual mode, or indeed multi-mode, operability, it will become increasingly necessary for each handset to search on more than one mode. Thus potential delays in network acquisition, and related user irritation, could become more frequently experienced. As explained further below network acquisition requires a search through a set of frequencies—generally defined by a frequency band in an attempt to identify the most suitable cell of a network. With dual mode operation, there will be multiple sets of frequencies to search through in order not only to find the most suitable cell, but also the most suitable network given the at least dual mode operability of the handset

SUMMARY OF THE INVENTION

The present invention seeks to provide for a network acquisition method and apparatus which exhibits advantages over known such methods and apparatus.

According to one aspect of the present invention, there is provided a method of network acquisition for a cellular radio communications device arranged for operation in accordance with a plurality of radio technologies and comprising searching to identify a suitable cell on one radio technology and, subsequent to identifying a suitable cell on the said one radio technology, comprising the steps of also monitoring cells on another of the plurality of radio technologies in order to identify if one of the said monitored cells is more suitable than the cell identified on the said one radio technology, and subsequent to said monitoring, selecting and camping for the first time on the cell identified from all of the radio technologies searched as the most suitable.

The invention is particularly advantageous in improving the initial search procedure when turning on a cellular radio communications device so as to advantageously reduce dead time experienced by the user and also to reduce handset energy consumption. In particular, the arrangement can save the handset from transmitting unnecessary signalling information and which procedures exhibit a high power requirement. The network is also saved from dealing with unnecessary signalling and processor loadings.

Advantageously, subsequent to identifying a suitable cell on the said one radio technology, the method can be arranged to monitor neighbouring cells on all the plurality of radio technologies of interest.

Yet further, and subsequent to the identification of a suitable cell on the said one radio technology, the method can be arranged to obtain the BA list provided for that identified cell but for the other of the available radio technologies.

In such a manner, the method is arranged to monitor cells on both radio technologies.

Preferably, when searching to identify a suitable cell, the cells are ranked in accordance with signal strength, or a derivative of signal strength, of signals received there from.

According to another aspect of the present invention there is provided a cellular radio communications device arranged for operation in accordance with a plurality of radio technologies and including means for searching to identify a suitable cell on one radio technology and means for monitoring cells on another of the plurality of radio technologies, subsequent to the identification of a suitable cell on the said one radio technology, so as to identify if one of the said monitored cells might prove more suitable than the said identified cell, and further including means for, subsequent to the said monitoring, selecting and camping on the cell identified as the most suitable.

Advantageously, the cellular radio communications device is arranged to operate in accordance with method steps as defined above.

BRIEF DESCRIPTION OF THE DRAWINGS

The invention is described further hereinafter, by way of example only, with reference to the accompanying drawings in which:

FIG. 2 is a flow diagram illustrating a method of network acquisition for use in relation to a plurality of radio technologies and according to an embodiment of the present invention.

DETAILED DESCRIPTION OF EXEMPLARY EMBODIMENTS OF THE INVENTION

Figure 1:
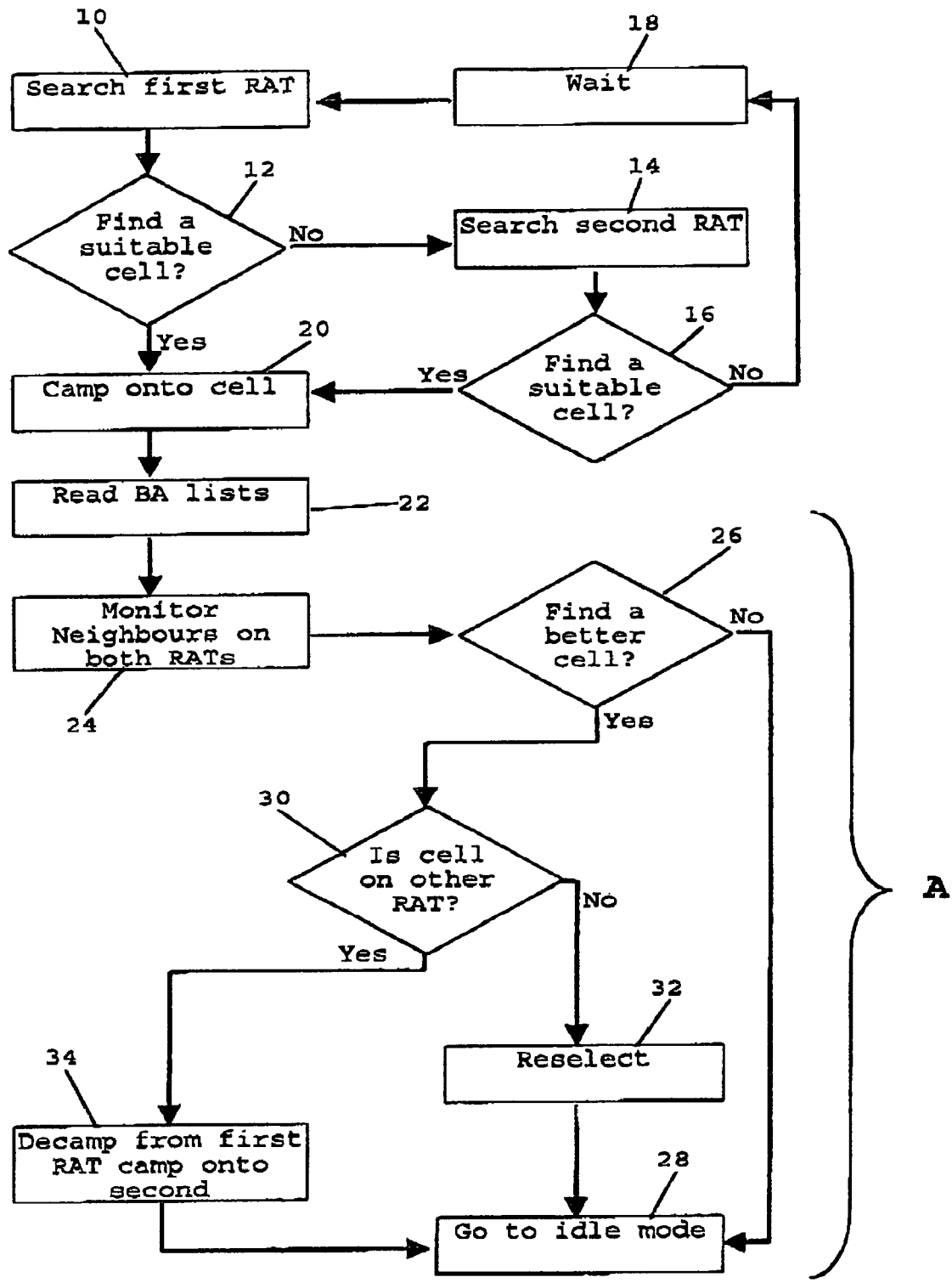
FIG. 1 is a flow chart illustrating network acquisition in relation to a plurality of radio technologies as currently known.

As will be appreciated, under the 3GPP specifications a handset is required to search one entire radio access technology (RAT) at a time. The relative priority of RATS is set within the handset and so in a dual mode GSM/UMTS handset an initial search of GSM or UMTS will be undertaken and the process will only look at the second RAT during initial selection if no suitable cells are found on the first RAT.

However, it may be that a cell on the second RAT is more suitable than a cell that has been located on the first RAT. Under the current scheme of operation, this will be detected after the handset has camped onto the cell found on the first RAT, read the neighbour cell lists, and monitored the cells of the second RAT. A reselection will then be performed. As this is an inter-RAT reselection, it is not a simple procedure and involves significant signalling traffic. Disadvantageously, this takes time and consumes energy.

Turning now to FIG. 1, the known method, for a dual mode phone, starts by searching the first radio technology RAT at step 10 in order to determine, at step 12, whether a suitable cell has been located.

If, at step 12, it is found that no suitable cell is located, the method proceeds to step 14 where the cells of the second RAT are searched to identify, at step 16, whether a suitable cell has been found.

If, at step 16 it is found that no suitable cell is identified on the second RAT, then the method returns to original step 10 via a holding step 18.

However, if in either of steps 12 or 16 it is found that a suitable cell does exist on one of the RATs, then the decision is taken at step 20 to camp on that cell for network acquisition purposes.

However, in accordance with the current art, in order to ensure that a more suitable cell does not exist elsewhere, once having identified an initially suitable cell, the method proceeds by steps 20, 24 by reading the BA (neighbour cell) list provided on that cell for both RATS, and also monitoring neighbouring cells on both RATS. If, after step 24, it is found at step 26 that a more suitable cell does not in fact exist than the one initially identified and camped upon at step 20, then the method proceeds to step 28 into its idle mode of operation.

However, if, at 26, it is determined that a more suitable cell than that camped upon at step 20 is in fact found, then the method proceeds to step 30 which seeks to determine whether or not this seemingly more suitable cell is found on the different RAT from which the cell camped upon at step 20 is found.

If this is not the case, then the cell of that RAT is simply reselected at step 32 and the method then proceeds into its idle mode at step 28.

However, if it is fact found at step 30 that the more suitable cell is located on the other RAT, then, at step 34, it is necessary to decamp from the first RAT and subsequently camp on the cell associated with the other of the two RATs.

Such processing can prove to be disadvantageous both as regards time delays and, in particular, power consumption. Step 20 and step 34 use relatively large amounts of power as they are procedures requiring the handset to transmit significant levels of signalling to the network.

Turning now to FIG. 2, however, there is an illustrated example of an embodiment of the present invention which offers advantages over that described in relation to FIG. 1.

It is therefore proposed that, before camping on to a cell identified on one RAT, the BA list provided on that cell for the alternate RAT should be read, and the cells monitored to see if any are preferable. This will lead to the initial search procedure taking a fraction of a second longer (unless combined with parallel search techniques which we describe in other applications). However, the mechanism potentially saves the handset transmitting unnecessary signalling and expending significant energy. Of course this also saves the network from dealing with unnecessary signalling—while the network is not particularly interested in the energy saving this provides, the mechanism also reduces the network signalling and processor loadings, which are useful effects.

Turning to FIG. 2, there is illustrated a somewhat similar initial procedure to that illustrated in FIG. 1, in which, at step 36, a search of the first RAT is conducted to identify, at step 38, whether a suitable cell has been located. If the suitable cell has not been located, the method proceeds to step 40 and a search of the second RAT to identify, at step 42, whether a suitable cell has been located on that second RAT. If no suitable cell is determined from the second RAT either, the process returns to initial step 36 via a holding step 44.

However, if, at step 38, a suitable cell is identified on the initial RAT searched at step 38, or indeed on the second RAT searched at step 42, the method proceeds to step 46 at which BA lists provided on that cell for the alternate RAT are read, and the cells monitored to identify if any likely more suitable cell to that identified at step 38 exists.

Importantly, it is noted that in accordance with the present invention at this stage no camping onto a cell has yet occurred.

Subsequent to steps 46,48 it is determined whether or not a more suitable cell than that identified at step 38 has been located.

If not, the method proceeds to step 52 at which the handset camps onto the original cell found at either of steps 38 and 42.

However, if the determination at step 50 indicates that a likely more suitable cell has in fact been located, then steps are simply taken at step 54 to camp onto the likely more suitable cell, Subsequent to the camping onto the appropriate cell at either of steps 52, 54, the method then proceeds into the idle mode 56 for the handset.

Thus, it will be appreciated from FIG. 2 that, whichever RAT eventually provides for the most suitable cell, only one camping step, and no subsequent de-camping step, is required.

This is best illustrated by a comparison of stage A in FIG. 1, with stage B in FIG. 2. stage B requiring far less power expenditure than stage A.

This mechanism is a dual mode search, and operates in a way compatible with the 3GPP specifications. However the mechanism is not limited to those technologies described in the 3GPP specifications; it is applicable to any multi RAT system where information on alternate RAT cells is provided in RAT broadcast information.

The invention claimed is:

1. A method of network acquisition for a cellular radio communications device arranged for operation in accordance with a plurality of radio technologies, said method comprising:
    searching to identify a suitable cell on one radio technology (RAT);
    subsequent to identifying a suitable cell on the one radio technology, also monitoring cells on each other of the plurality of radio technologies in order to identify if one of the monitored cells is more suitable than the cell identified on the one radio technology; and
    subsequent to said monitoring, selecting and camping, as an initial camping during a power up sequence, on a cell identified from all of the radio technologies searched as most suitable.

2. A method as claimed in claim 1, wherein said monitoring the cells on each other RAT comprises monitoring neighbouring cells on all of the plurality of RATs.

3. A method as claimed in claim 1, wherein the monitoring cells on another RAT comprises obtaining a BA (neighboring cell) list on the identified cell but for all of the plurality of other RATs read.

4. A method as claimed in claim 1, wherein the suitability of the cells is determined on a basis of a strength of a signal received therefrom.

5. A method as claimed in claim 1, wherein the identifying a suitable cell comprises determining a derivative of a strength of a signal received therefrom.

6. A cellular radio communications device arranged for operation in accordance with a plurality of radio technologies, comprising:
   means for searching to identify a suitable cell on one radio technology (RAT);
   means for monitoring cells on each other of the plurality of radio technologies (RATs), subsequent to an identification of a suitable cell on the one radio technology, so as to identify if one of the monitored cells might prove more suitable than the identified cell; and
   means for, subsequent to the monitoring, selecting and camping on a cell identified as most suitable, as an initial camping during a power up sequence of said cellular radio communications device.

7. A cellular radio communications device arranged for operation in accordance with a plurality of radio technologies (RATs), comprising:
   means for searching to identify a suitable cell on one radio technology;
   means for monitoring cells on each other of the plurality of radio technologies, subsequent to the identification of a suitable cell on the one radio technology, so as to identify if one of the monitored cells might prove more suitable than the identified cell; and
   means for, subsequent to the monitoring, selecting and camping, as an initial camping during a power up sequence of said cellular radio communications device, on a cell identified as most suitable, wherein said monitoring the cells on each other RAT comprises monitoring neighbouring cells on all of the plurality of RATs.

8. A method as claimed in claim 2, wherein the monitoring of cells on another RAT comprises obtaining a BA (neighboring cell) list on the identified cell but for all of the plurality of other RATs read.

9. A method as claimed in claim 2, wherein the suitability of the cells is determined on a basis of a strength of a signal received therefrom.

10. A method as claimed in claim 3, wherein the suitability of the cells is determined on a basis of a strength of a signal received therefrom.

11. A method as claimed in claim 2, wherein the identifying a suitable cell comprises determining a derivative of a strength of a signal received therefrom.

12. A method as claimed in claim 3, wherein the identifying a suitable cell comprises determining a derivative of a strength of a signal received therefrom.

13. A cellular radio communications device arranged for operation in accordance with a plurality of radio technologies (RATs) comprising:
   means for searching to identify a suitable cell on one radio technology (RAT);
   means for monitoring cells on each other of the plurality of radio technologies, subsequent to the identification of a suitable cell on the one radio technology, so as to identify if one of the monitored cells might prove more suitable than the identified cell; and
   means for, subsequent to the monitoring, selecting and camping, for a first camping during a power up sequence of said cellular radio communications device, on a cell identified as most suitable, wherein the monitoring cells on each other RAT comprises obtaining a BA (neighboring cell) list on the identified cell but for all of the plurality of other RATs read.

14. A cellular radio communications device arranged for operation in accordance with a plurality of radio technologies (RATs), comprising:
   means for searching to identify a suitable cell on one radio technology (RAT);
   means for monitoring cells on each other of the plurality of radio technologies (RATs), subsequent to the identification of a suitable cell on the one radio technology, so as to identify if one of the monitored cells might prove more suitable than the identified cell; and
   means for, subsequent to the monitoring, selecting and camping, for a first time during a power up sequence of said cellular radio communications device, on a cell identified as most suitable, wherein the suitability of the cells is determined on a basis of a strength of a signal received therefrom.

15. A cellular radio communications device arranged for operation in accordance with a plurality of radio technologies (RATs), comprising:
   means for searching to identify a suitable cell on one radio technology (RAT);
   means for monitoring cells on each other of the plurality of radio technologies, subsequent to the identification of a suitable cell on the one radio technology, so as to identify if one of the monitored cells might prove more suitable than the identified cell; and
   means for, subsequent to the monitoring, selecting and camping, for a first time during a power-up sequence of said cellular radio communications device, on a cell identified as most suitable, wherein the identifying a suitable cell comprises determining a derivative of a strength of a signal received therefrom.

* * * * *